United States Patent
Wang

(10) Patent No.: US 7,335,039 B2
(45) Date of Patent: Feb. 26, 2008

(54) MEMORY CARD CONNECTOR

(75) Inventor: Hsu-Fen Wang, Hsin-Tien (TW)

(73) Assignee: Advanced-Connectek Inc., Taipei Hsien (TW)

( * ) Notice: Subject to any disclaimer, the term of this patent is extended or adjusted under 35 U.S.C. 154(b) by 0 days.

(21) Appl. No.: 11/706,235

(22) Filed: Feb. 15, 2007

(65) Prior Publication Data

US 2007/0224863 A1 Sep. 27, 2007

(30) Foreign Application Priority Data

Mar. 24, 2006 (TW) .............................. 95204990 U

(51) Int. Cl.
*H01R 13/62* (2006.01)
(52) U.S. Cl. ................................... 439/159
(58) Field of Classification Search ............... 439/159, 439/630, 945–946, 638; 361/737–738
See application file for complete search history.

(56) References Cited

U.S. PATENT DOCUMENTS

| 6,977,795 | B2 * | 12/2005 | Matsumura .............. 360/98.04 |
| 6,987,641 | B2 * | 1/2006 | Matsumura et al. ..... 360/98.04 |
| 7,070,453 | B1 * | 7/2006 | Chen .......................... 439/630 |

* cited by examiner

Primary Examiner—J. F. Duverne
(74) Attorney, Agent, or Firm—Bacon & Thomas, PLLC

(57) ABSTRACT

A memory card connector for a first memory card or a second memory card has an insulative housing, a terminal set and a shell. The insulative housing has a first space for the first memory card and a second space for the second memory card. The terminal set is mounted in the insulative housing and has plural terminals and at least two auxiliary terminals. Each auxiliary terminal has an engagement portion preventing a short circuit due to a wrong contact of the auxiliary terminal and the second memory. The memory card connector has only one terminal set, therefore is compact and has a low cost.

8 Claims, 4 Drawing Sheets

MEMORY CARD CONNECTOR

BACKGROUND OF THE INVENTION

1. Field of the Invention

The present invention relates to a memory card connector, and more particularly to a memory card connector that may accommodate and hold two different types of memory cards, is compact and has a low cost.

2. Description of Related Art

Memory cards are used generally in electronic devices such as digital cameras, digital video cameras and computers. The memory cards have different types being non-compatible. To read data in a memory card of a specific type, a computer needs to connect to a specific memory card connector. However, connecting the computer to different types of memory card connectors in order to accommodate different types of memory card is inconvenient and has a high cost.

A multifunctional memory card connector has been developed for receiving and holding different types of memory cards so reading different memory cards in one computer is convenient and cheap. However, the multifunctional memory card connector usually has plural terminal sets that each set has plural conductive zones. The conductive zones of different sets are located in different positions and are exclusively used respectively for different types of memory cards. Accordingly, the multifunctional memory card connector has a considerable size and a high cost.

To overcome the shortcomings, the present invention provides a memory card connector to mitigate or obviate the aforementioned problems.

SUMMARY OF THE INVENTION

The main objective of the invention is to provide a memory card connector that may accommodate and hold two different types of memory cards, is compact and has a low cost for manufacturing.

A memory card connector in accordance with the present invention is applied with a first memory card or a second memory card and comprises an insulative housing, a terminal set and a shell. The insulative housing has a first space for the first memory card and a second space for the second memory card. The terminal set is mounted in the insulative housing and has plural terminals and at least two auxiliary terminals. Each auxiliary terminal has an engagement portion preventing a short circuit due to a wrong contact of the auxiliary terminal and the second memory.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
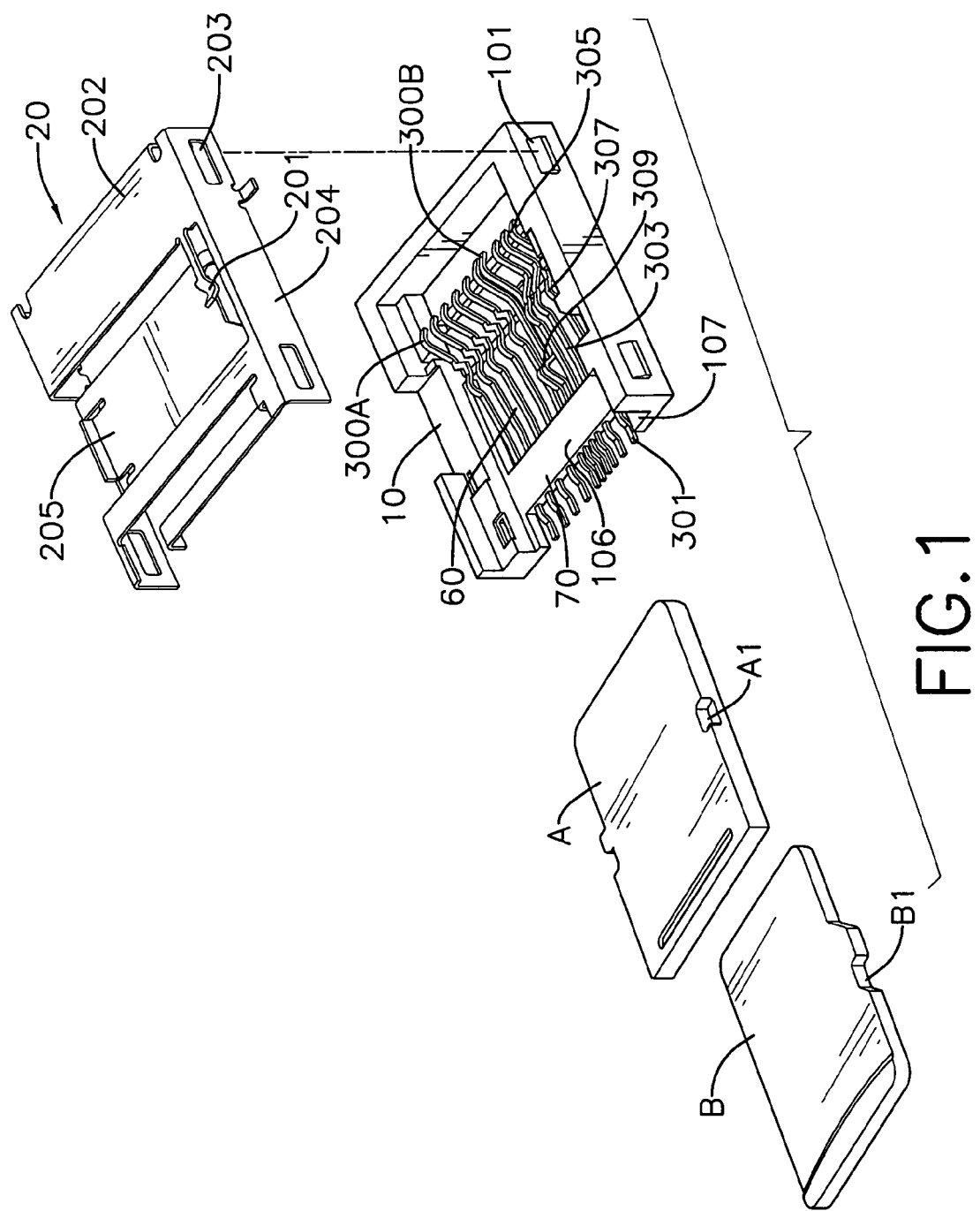
FIG. 1 is an exploded perspective view of a memory card connector in accordance with the present invention with a first type memory card and a second type memory card.
Figure 2:
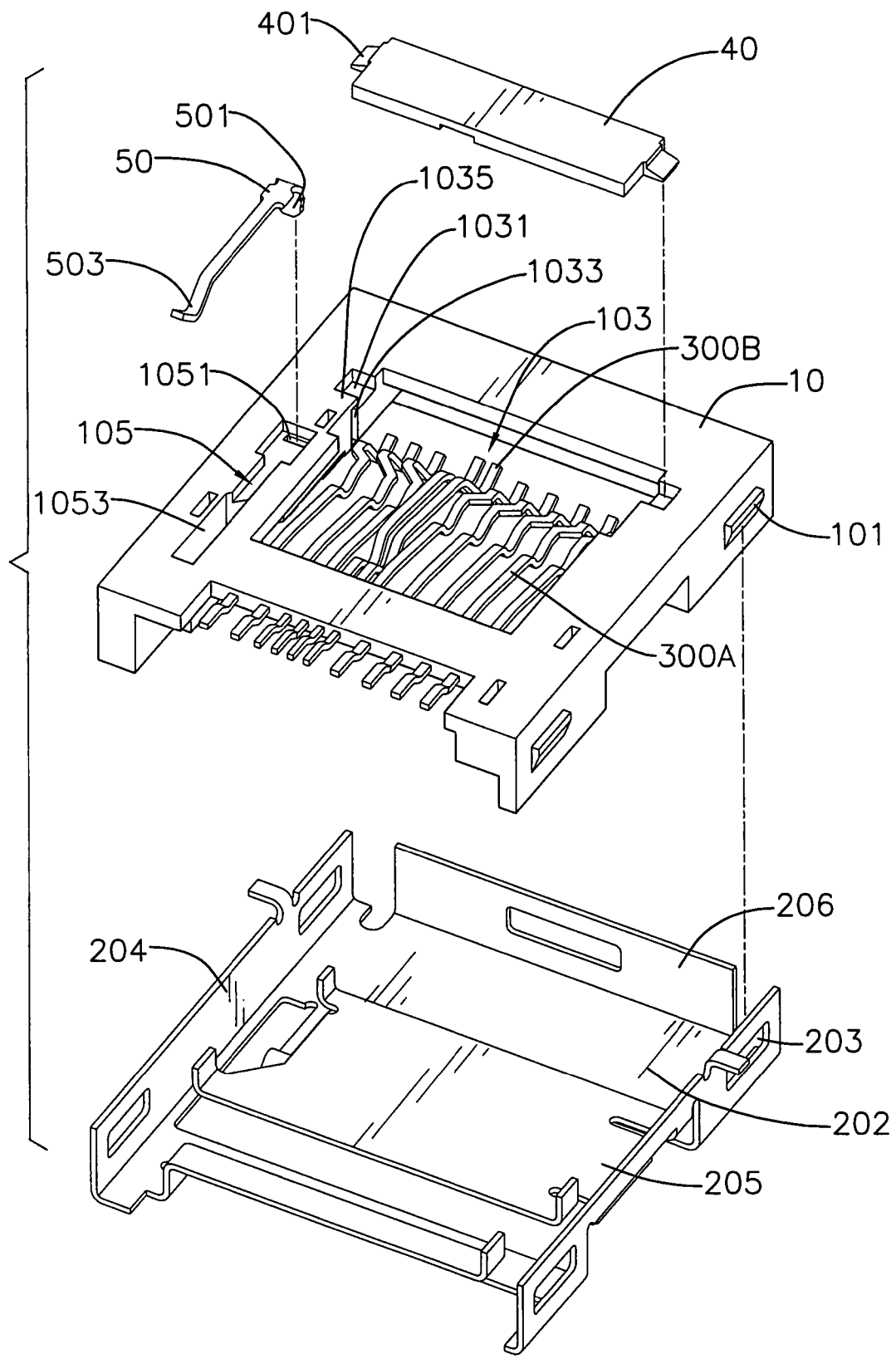
FIG. 2 is an enlarged and exploded bottom perspective view of the memory card connector in FIG. 1.
Figure 3:
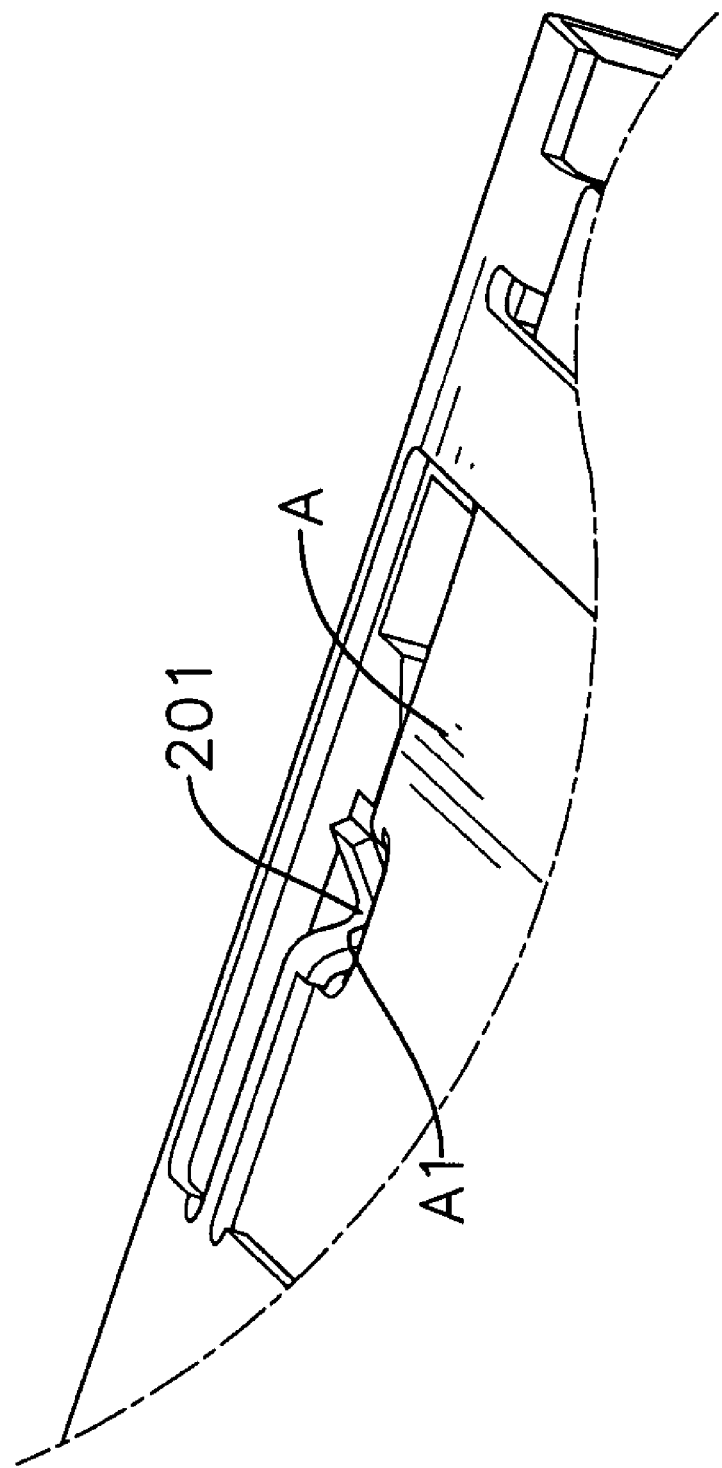
FIG. 3 is an enlarged operational perspective view of the memory card connector engaged with the first type memory in FIG. 1.

With reference to FIGS. 1 and 2, a memory card connector in accordance with the present invention may accommodate and hold two different types of memory cards. The one type of memory card is Micro Secure Digital (SD) card or the like, which is called a first memory card (A) hereafter. The first memory card (A) has two sides, a locking recess (A1) and plural conductive zones. The locking recess (A1) is defined in one side. The other type of memory card is Multimedia Memory card (MMC card), which is called a second memory card (B) hereafter. The second memory card (B) has two sides, a locking recess (B1) and plural conductive zones. The locking recess (B1) is defined in one side.

The memory card connector comprises an insulative housing (10), a terminal set (30) and a shell (20).

The insulative housing (10) has a top, a bottom, a front, a rear, two sides, a top opening, a bottom opening (103), a crossbar bracket (106), a mounting slot (105), a first space (60), a second space (70), at least one pair of side hooks (101), an auxiliary member (40) and a snap member (50).

The bottom has an outer bottom surface.

The top opening is defined in the top.

The bottom opening (103) is defined in the bottom and has an inner edge and two mounting recesses (1031). The mounting recesses (1031) are defined in the outer bottom surface adjacent to the bottom opening (103), are located respectively at the sides of the insulative housing (10) and each mounting recess (1031) has an inner surface, a limit (1035) and an inside slot (1033). The limit (1035) is formed on and extends inward from the inner surface. The inside slot (1033) is defined in the inner surface under the limit (1035).

The crossbar bracket (106) is formed transversely on the bottom adjacent to the bottom opening (103).

The mounting slot (105) is defined in the outer bottom surface of the bottom at one side and has an inner bottom surface, an inner recess (1051) and a through hole (1053). The inner recess (1051) is defined in the inner bottom surface. The through hole (1053) is defined through the inner bottom surface.

The first space (60) is defined in the front, is communicated with the top opening, holds the first memory card (A) and has an inner bottom surface.

The second space (70) is defined in the front, is defined in the inner bottom surface of the first space (60), is communicated with the bottom opening and the first space (60), is communicated with the through hole (1053), holds the second memory card (B) and has an inner bottom surface (107).

The side hooks (101) of each pair are formed respectively on the sides of the insulative housing (10).

The auxiliary member (40) is mounted in the inner edge of the bottom opening (103) and has two ends and two mounting protrusions (401). The mounting protrusions (401) are formed respectively on the ends, are mounted respectively in the inside slots (1033) through the mounting recesses (1031) and are blocked respectively by the limits (1035).

Figure 4:
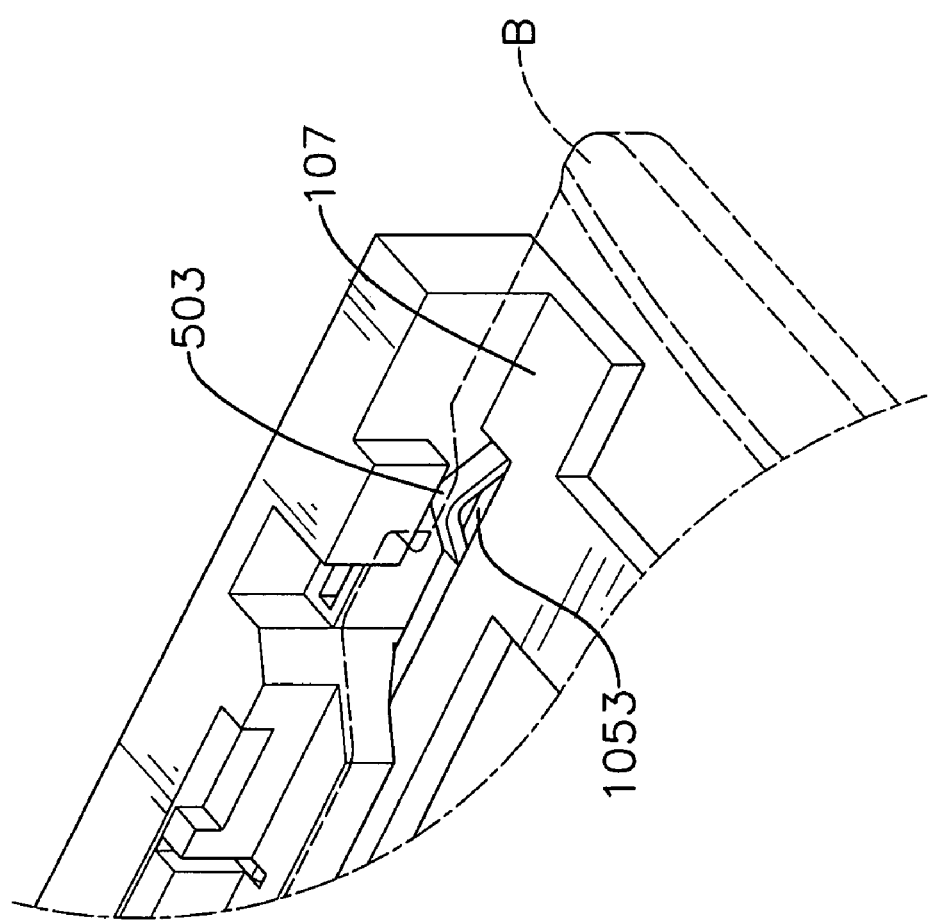
FIG. 4 is an enlarged perspective view of the memory card connector in FIG. 1.

With further reference to FIG. 4, the snap member (50) is mounted in the mounting slot (105) and selectively engages with the locking recess (B1) in the second memory card (B) to prevent the second memory card (B) from inadvertently falling out of the second space (70). The snap member (50) has a proximal end, a distal end, a mounting tab (501) and a locking element (503). The mounting tab (501) is formed perpendicularly on the proximal end and is mounted in the inner recess (1051) in the mounting slot (105). The locking element (503) is V-shaped, is formed at the distal end, is mounted through the through hole (1053) in the mounting slot (105), extends out from the inner bottom surface (107) of the second space (70) and selectively engages with the locking recess (B1) in the second memory card (B).

The terminal set (30) is mounted on the crossbar bracket (106) on the insulative housing (10), extends in the first space (60) and the second space (70), selectively contacts the conductive zones on the first or second memory card (A, B) and has plural terminals (300A) and at least two auxiliary terminals (300B).

The terminals (300A) are resilient, are arranged abreast and mounted in the insulative housing (10), respectively contact some of the conductive zones of the first memory card (A) or all of the conductive zones of the second memory card (B) so data transmission may be implemented between the first or second memory card (A, B) and the memory card connector. Each terminal (300A) has a proximal end and a distal end, a soldering portion (301), a first contact portion (305) and a second contact portion (307). The distal end of the terminal (300A) selectively abuts the auxiliary member (40) so that the terminal (300A) tightly contacts one conductive zone on the first or second memory card (A, B). The soldering portion (301) is formed at the proximal end of the terminal (300A) and is mounted securely through the crossbar bracket (106) on the insulative housing (10). The first contact portion (305) is formed at the distal end of the terminal (300A) and contacts one conductive zone on the first memory card (A). The second contact portion (307) is formed on the terminal (300A) between the proximal end and the distal end, is located lower than the first contact portion (305) and contacts one conductive zone on the second memory card (B).

The at least two auxiliary terminals (300B) are resilient, are arranged abreast with the terminals (300A), are mounted in the insulative housing (10) and exclusively contact remains of the conductive zones of the first memory card (A) respectively. Each auxiliary terminal (300B) has a proximal end, a distal end, a soldering portion (301), a first contact portion (305) and an engagement portion (309). The distal end of the auxiliary terminal (300B) selectively abuts the auxiliary member (40) so the auxiliary terminal (300B) tightly contacts one conductive zone on the first memory card (A). The soldering portion (301) is formed at the proximal end and is mounted securely through the crossbar bracket (106) on the insulative housing (10). The first contact portion (305) is formed at the distal end, is located higher than the second contact portions (307) on the terminals (300A) and contacts one of the remains of the conductive zones of the first memory card (A). The engagement portion (309) is formed on the auxiliary terminal (300B) between the proximal end and the distal end, is staggered with the second contact portions (307) on the terminals (300A) and is a curved and protrudes upward. The engagement portion (309) presses against the second memory card (B) to bend the auxiliary terminal (300B) downward and prevent the auxiliary terminal (300B) from wrongly contacting one conductive zone on the second memory card (B) and causing a short circuit when the second memory card (B) is mounted in the second space (70).

The shell (20) is mounted on and encloses the insulative housing (10) and has a top (202), a bottom, a top opening, two sidewalls (204), a rear wall (206), a locking arm (201), a spacer (205) and at least one pair of mounting holes (203).

The top opening is defined through the top (202). The top opening has an inner edge.

The locking arm (201) is formed on and extends longitudinally from the inner edge of the top opening in the shell (20) and has a proximal end, a distal end and a locking component. The locking component is formed at the distal end, extends through the top opening in the first space (60) in the insulative housing (10) and selectively engages with the locking recess (A1) in the first memory card (A) to prevent the first memory card (A) from falling out of the memory card connector inadvertently.

The spacer (205) is formed on and extends transversely from one sidewall (204), is located above the terminal set (30) and separates the first space (60) from the second space (70).

The at least one pair of the mounting holes (203) corresponds respectively to the at least one pair of the side hooks (101). The mounting holes (203) of each pair are defined respectively through the sidewalls (204) of the shell (20) and are engaged respectively with the side hooks (101) of a corresponding pair to securely mount the shell (20) on the insulative housing (10).

Once the second memory card (B) is inserted in to the second space (70) of the memory card connector, the first contact portion (305) of each auxiliary terminal (300B) is moved away from a nearest conductive zone of the second memory card (B).

With the engagement portion (309) on each auxiliary terminal (330B), the terminal set (30) may selectively contact the first or second memory cards (A, B). Because the memory card connector has only one terminal set (30) for different memory cards, the memory card connector is compact and has a low cost for manufacturing.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A memory card connector adapted to accommodate and a first memory card having plural conductive zones, and a second memory card having plural conductive zones, the memory card connector comprising:
    an insulative housing having a spacer to define a first space for accommodating the first memory card and a second space for accommodating the second memory card;
    a plurality of terminals, each arranged in the insulative housing and having a soldering portion, a first contact portion and a second contact portion;
    at least two auxiliary terminals, each arranged in the insulative housing and having a soldering portion, a first contact portion and an engagement portion; and
    a shell enclosing the insulative housing;
    whereby once the second memory card is inserted in to the second space of the memory card connector, the first contact portion of each auxiliary terminal is moved away from the nearest conductive zone of the second memory card.

2. The memory card connector as claimed in claim 1, wherein:
    the insulative housing further has a top, a bottom, a front, a rear face and two sides; and
    the first space and the second space are defined on the front surface.

3. The memory card connector as claimed in claim 2, wherein:
   the terminals are arranged in a row and are adapted to respectively contact some of the conductive zones of the first memory card or all of the conductive zones of the second memory card, and each terminal has a proximal end and a distal end;
   the first contact portion of each terminal is formed at the distal end and is adapted to contact one conductive zone on the first memory card, and the second contact portion of each terminal is formed on the terminal between the proximal end and the distal end and is adapted to contact one conductive zone on the second memory card;
   the at least two auxiliary terminals, are arranged abreast with the terminals and are adapted to exclusively contact remains of the conductive zone on the first memory card respectively, and each auxiliary terminal has a proximal end and a distal end;
   the first contact portion of each auxiliary terminal is formed at the distal end of the auxiliary terminal and is adapted to contact one of the remains of the conductive zone of the first memory card, and the engagement portion of each auxiliary terminal is formed on the auxiliary terminal between the proximal end and the distal end of the auxiliary terminal, is staggered with the second contact portions of the terminals, protrudes upward and is adapted to press against the second memory card to prevent the auxiliary terminal from wrongly contacting one conductive zone on the second memory card.

4. The memory card connector as claimed in claim 3, wherein the second contact portions are located lower than the first contact portions.

5. The memory card connector as claimed in claim 4, wherein:
   the bottom surface of the insulative housing has an outer bottom surface;
   the insulative housing further has
     a top opening defined through the top and communicated with the first space; and
     a bottom opening defined through the bottom and communicated with the second space;
   the shell has
     a top;
     a bottom;
     a top opening having an inner edge; and
     a locking arm formed on and extending from the inner edge of the top opening in the shell and having a distal end and a locking component formed at the distal end, extending through the top opening in the first space in the insulative housing and adapted to selectively engage with the locking recess in the first memory card.

6. The memory card connector as claimed in claim 5, wherein the shell further has two sidewalls and a spacer formed on and extending transversely from one sidewall, located above the terminal set and separates the first space from the second space.

7. The memory card connector as claimed in claim 6, wherein:
   the bottom opening of the insulative housing has an inner edge and two mounting recesses defined in the outer bottom surface adjacent to the bottom opening, located respectively at the sides of the insulative housing and each mounting recess having
     an inner surface;
     a limit formed on and extending inward from the inner surface; and
     an inside slot defined in the inner surface under the limit;
   the insulative housing further has an auxiliary member mounted in the inner edge of the opening and having
     two ends; and
     two mounting protrusions formed respectively on the ends, mounted respectively in the inside slots through the mounting recesses and blocked respectively by the limit; and
   the distal ends of the terminals and the auxiliary terminals selectively abut the auxiliary member.

8. The memory card connector as claimed in claim 7, wherein the insulative housing further has
   a mounting slot defined in the outer bottom surface of the bottom at one side of the insulative housing and having
     an inner bottom surface;
     an inner recess defined in the inner bottom surface; and
     a through hole defined through the inner bottom surface and communicated with the second space; and
   a snap member mounted in the mounting slot, adapted to selectively engage with the locking recess in the second memory card and having
     a proximal end;
     a distal end;
     a mounting tab formed perpendicularly on the proximal end of the snap member and mounted in the inner recess in the mounting slot; and
     a locking element being V-shaped, formed at the distal end of the snap member, mounted through the through hole in the mounting slot, extending out from the inner bottom surface of the second space and adapted to selectively engage with the locking recess in the second memory card.

* * * * *